US012692383B2

(12) United States Patent
Jung et al.

(10) Patent No.: US 12,692,383 B2
(45) Date of Patent: Jul. 28, 2026

(54) RESIN COMPOSITION AND MOLDED PRODUCT

(71) Applicant: LG CHEM, LTD., Seoul (KR)

(72) Inventors: Dae San Jung, Daejeon (KR); Jun Ho Choe, Daejeon (KR); Seong Lyong Kim, Daejeon (KR); Ho Namgung, Daejeon (KR); Seok Hee Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 634 days.

(21) Appl. No.: 17/918,266

(22) PCT Filed: Sep. 28, 2021

(86) PCT No.: PCT/KR2021/013254
§ 371 (c)(1),
(2) Date: Oct. 11, 2022

(87) PCT Pub. No.: WO2022/065990
PCT Pub. Date: Mar. 31, 2022

(65) Prior Publication Data
US 2023/0174770 A1 Jun. 8, 2023

(30) Foreign Application Priority Data
Sep. 28, 2020 (KR) ........................ 10-2020-0126122

(51) Int. Cl.
*C08L 55/02* (2006.01)
(52) U.S. Cl.
CPC ........... *C08L 55/02* (2013.01); *C08L 2201/08* (2013.01); *C08L 2205/025* (2013.01); *C08L 2205/035* (2013.01)
(58) Field of Classification Search
CPC .... C08L 2205/035; C08L 55/02; C08L 51/06; C08L 91/06; C08L 33/24; C08L 25/12; C08L 23/0815
See application file for complete search history.

(56) References Cited

U.S. PATENT DOCUMENTS 5,109,066 A * 4/1992 Ilenda ...................... C08L 23/16
525/309
5,532,317 A * 7/1996 Shinmura ............... C08L 55/02
525/73

2017/0292017 A1* 10/2017 Jung ........................ C08L 25/08
2017/0306151 A1 10/2017 Sakata et al.
2019/0119481 A1 4/2019 Michaelis de Vasconcellos et al.
2019/0177523 A1 6/2019 Jung et al.
2020/0239682 A1 7/2020 Ryoo et al.
2021/0179840 A1 6/2021 Kim et al.

FOREIGN PATENT DOCUMENTS

| CN | 106715594 A | 5/2017 |
|---|---|---|
| CN | 108699317 A | 10/2018 |
| CN | 109476895 A | 3/2019 |
| CN | 111032778 A | 4/2020 |
| CN | 111278913 A | 6/2020 |
| EP | 3686243 A1 | 7/2020 |
| JP | 5528142 B2 | 6/2014 |
| KR | 10-1998-0073191 A | 11/1998 |
| KR | 10-2015-0068313 A | 6/2015 |
| KR | 10-2017-0070011 A | 6/2017 |
| KR | 10-2018-0068566 A | 6/2018 |
| KR | 10-2018-0074280 A | 7/2018 |
| KR | 10-2018-0136512 A | 12/2018 |
| KR | 10-1974164 B1 | 4/2019 |
| KR | 10-2019-0060432 A | 6/2019 |
| KR | 2019-0069307 A | 6/2019 |
| KR | 10-2030120 B1 | 10/2019 |
| KR | 10-2020-0049381 A | 5/2020 |

OTHER PUBLICATIONS

Matweb Search Results (Year: 2025).*
LC875 Technical Data Sheet by Lg (Year: 2021).*
Matweb LC875 data sheet (Year: 2025).*
Extended European Search Report issued in application 21873018.2 dated Feb. 28, 2024.
Office Action dated Oct. 14, 2024 issued in Chinese patent application 202180029447.
International Search Report (with partial translation) and Written Opinion dated Jan. 14, 2022, for corresponding International Patent Application No. PCT/KR2021/013254.

* cited by examiner

*Primary Examiner* — Mark S Kaucher
(74) *Attorney, Agent, or Firm* — Morgan, Lewis & Bockius LLP

(57) ABSTRACT

The present disclosure relates to a resin composition including a base resin including a first graft copolymer, a second graft copolymer and a maleimide-based copolymer; a polyolefin elastomer; a polyolefin graft copolymer; and a polyolefin wax. The present disclosure also relates to a molded product molded from the resin composition.

4 Claims, No Drawings

RESIN COMPOSITION AND MOLDED PRODUCT

CROSS-REFERENCE TO RELATED APPLICATIONS

The present application claims the benefit of priority based on Korean Patent Application No. 10-2020-0126122, filed on Sep. 28, 2020, the entire contents of which are incorporated herein by reference.

TECHNICAL FIELD

The present invention relates to a resin composition, and particularly, to a resin composition having excellent friction noise resistance, heat resistance and mechanical properties, and a molded product molded therefrom.

BACKGROUND ART

Acrylonitrile-butadiene-styrene (ABS) copolymers are prepared by graft copolymerizing a butadiene rubbery polymer with styrene and acrylonitrile. The ABS copolymers have excellent impact resistance, chemical resistance, thermal stability, colorability, fatigue resistance, hardness and processability when compared to the conventional high-impact polystyrene (HIPS), and are used in automotive interior and exterior materials, office equipment, parts for various electrical and electronic products, toys, or the like.

Particularly, the ABS copolymers used for the automotive interior materials are basically required to have mechanical properties and heat resistance and further, friction noise resistance for preventing the deterioration of quietness by noise occurred by the friction due to the contact with adjacent interior materials.

In order to improve such friction noise resistance, Japanese Registration Patent Publication No. 5528142 suggests a method of applying an ABS resin and silicone oil to ABS copolymers. However, since the silicone oil is expensive, there is no choice but to deteriorate the productivity.

PRIOR ART DOCUMENT

Patent Document (Patent Document 1) JP5528142B2

DISCLOSURE OF THE INVENTION

Technical Problem

The present invention is devised to solve the defects of the conventional technique and has an object to provide a resin composition which may improve friction noise resistance without using expensive silicone oil in the resin composition, during molding a molded product from a resin composition including an ABS copolymer, used at a position where friction occurs, such as automotive interior materials.

In addition, another object of the present invention is to provide a resin composition having excellent mechanical properties and heat resistance as well as improving friction noise resistance.

In addition, another object of the present invention is to provide a molded product molded from the resin composition.

Technical Solution

In order to solve the above task, there are provided in the present invention, a resin composition and a molded product.

(1) The present invention provides a resin composition comprising a base resin comprising a first graft copolymer, a second graft copolymer and a maleimide-based copolymer; a polyolefin elastomer; a polyolefin graft copolymer; and a polyolefin wax.

(2) The present invention provides the resin composition of (1) above, wherein the first graft copolymer comprises 5 wt % to 30 wt % of a rubbery polymer, 5 wt % to 30 wt % of a vinyl cyan-based monomer unit, and 40 wt % to 90 wt % of an aromatic vinyl-based monomer unit, and the first graft copolymer is bulk polymerized.

(3) The present invention provides the resin composition of (1) or (2) above, wherein the second graft copolymer comprises 40 wt % to 80 wt % of a rubbery polymer, 1 wt % to 30 wt % of a vinyl cyan-based monomer unit, and 10 wt % to 50 wt % of an aromatic vinyl-based monomer unit, and the second graft copolymer is emulsion polymerized.

(4) The present invention provides the resin composition of any one of (1) to (3) above, wherein the maleimide-based copolymer comprises a maleimide-based monomer unit, an aromatic vinyl-based monomer unit and a maleic anhydride monomer unit.

(5) The present invention provides the resin composition of any one of (1) to (4) above, wherein the base resin comprises a styrene-based copolymer comprising an aromatic vinyl-based monomer unit and a vinyl cyan-based monomer unit.

(6) The present invention provides the resin composition of any one of (1) to (5) above, wherein the base resin comprises 40 wt % to 80 wt % of the first graft copolymer, 1 wt % to 30 wt % of the second graft copolymer, 5 wt % to 40 wt % of the maleimide-based copolymer and 0 wt % to 30 wt % of a styrene-based copolymer.

(7) The present the resin invention provides composition of any one of (1) to (6) above, wherein the polyolefin elastomer is a copolymer of ethylene and an alpha olefin of 3 to 8 carbon atoms.

(8) The present invention provides the resin composition of any one of (1) to (7) above, wherein the polyolefin graft copolymer is a polyethylene-based acrylonitrile-styrene copolymer.

(9) The present invention provides the resin composition of any one of (1) to (8) wherein the polyolefin wax is a polyethylene wax.

(10) The present invention provides the resin composition of any one of (1) to (9) above, wherein the resin composition comprises, based on 100 parts by weight of the base resin, 0.1 parts by weight to 10.0 parts by weight of the polyolefin elastomer, 0.1 parts by weight to 10.0 parts by weight of the polyolefin graft copolymer, and 0.1 parts by weight to 10.0 parts by weight of the polyolefin wax.

(11) The present invention provides the resin composition of any one of (1) to (10) above, wherein the resin composition has a heat deflection temperature measured at a load of 18.6 kgf according to ASTM D648 of 100° C. or higher, and an RPN ranking measured using a stick-slip tester at 25° C. and a relative humidity of 50% according to VDA 230-206 of 3 or less.

(12) The present invention provides a molded product molded from the resin composition according to any one of (1) (11) above.

Advantageous Effects

The resin composition according to the present invention has excellent mechanical properties and heat resistance, and has effects of improving friction noise resistance without using expensive silicone oil in the resin composition, during molding a molded product used at a position where friction may occur, such as automotive interior materials.

BEST MODE FOR CARRYING OUT THE INVENTION

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "monomer unit" in the present invention may represent a component or a structure derived from a monomer, or a material itself, and a particular example may mean a repeating unit formed in a polymer through the participation of a monomer injected in polymerization reaction during polymerizing the polymer.

The term "composition" used in the present invention includes a reaction product and a decomposition product formed from a material of a corresponding composition as well as a mixture of materials including the corresponding composition.

The present invention provides a resin composition, particularly, a resin composition for molding a molded product used at a position where friction may occur, including automotive interior materials.

According to an embodiment of the present invention, the resin composition may include a base resin including a first graft copolymer, a second graft copolymer and maleimide-based copolymer; a polyolefin elastomer; a polyolefin graft copolymer; and a polyolefin wax. The base resin and each component in the resin composition are essential for improving mechanical properties, heat resistance and friction noise resistance simultaneously.

According to an embodiment of the present invention, the base resin is a resin component for forming the base of the resin composition and may include the first graft copolymer, the second graft copolymer and the maleimide-based copolymer.

According to an embodiment of the present invention, the first graft copolymer may be a copolymer obtained by graft copolymerizing a vinyl cyan-based monomer unit and an aromatic vinyl-based monomer unit in a rubbery polymer including a conjugated diene-based monomer unit. In a particular embodiment, the first graft copolymer may include 5 wt % to 30 wt % of the rubbery polymer, 5 wt % to 30 wt % of the vinyl cyan-based monomer unit and 40 wt % to 90 wt % of the aromatic vinyl-based monomer unit, and may be bulk polymerized.

According to an embodiment of the present invention, in the first graft copolymer, the rubbery polymer may be included in 5 wt % to 30 wt %, 5 wt % to 20 wt %, or 10 wt % to 15 wt % based on the first graft copolymer, and within this range, effects of preventing the deterioration of impact resistance of the resin composition may be achieved.

According to an embodiment of the present invention, in the rubbery polymer of the first graft copolymer, the conjugated diene-based monomer forming the conjugated diene-based monomer unit may be one or more selected from the group consisting of 1,3-butadiene, 2,3-dimethyl-1, 3-butadiene, piperylene, 3-butyl-1,3-octadiene, isoprene and 2-phenyl-1,3-butadiene, in a more preferred embodiment, 1,3-butadiene.

According to an embodiment of the present invention, the rubbery polymer of the first graft copolymer may be a conjugated diene-based rubbery polymer including only a conjugated diene-based monomer, and in another embodiment, may be a conjugated diene-based-aromatic vinyl-based rubbery polymer including an aromatic vinyl-based monomer unit together with a conjugated diene-based monomer unit.

According to an embodiment of the present invention, in the rubbery polymer of the first graft copolymer, the aromatic vinyl-based monomer forming the aromatic vinyl-based monomer unit may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, if the rubbery polymer of the first graft copolymer is the conjugated diene-based-aromatic vinyl-based rubbery polymer, each content of the conjugated diene-based monomer unit and the aromatic vinyl-based rubbery polymer unit in the rubbery polymer may be controlled, as necessary.

According to an embodiment of the present invention, in the first graft copolymer, the vinyl cyan-based monomer unit may be a component derived from the vinyl cyan-based monomer unit graft polymerized in the rubbery polymer, and may be included in 5 wt % to 30 wt %, 10 wt % to 30 wt %, or 15 wt % to 20 wt % based on the first graft copolymer. Within this range, effects of improving the mechanical properties of the resin composition may be achieved.

According to an embodiment of the present invention, the vinyl cyan-based monomer unit forming the vinyl cyan-based monomer unit of the first graft copolymer may be one or more selected from the group consisting of acrylonitrile, methacrylonitrile, ethacrylonitrile, phenylacrylonitrile and α-chloroacrylonitrile, particularly, acrylonitrile.

According to an embodiment of the present invention, in the first graft copolymer, the aromatic vinyl-based monomer unit may be a component derived from the aromatic vinyl-based monomer unit graft polymerized in the rubbery polymer, and may be included in 40 wt % to 90 wt %, 50 wt % to 80 wt %, or 65 wt % to 75 wt % based on the first graft copolymer. Within this range, effects of improving the mechanical properties of the resin composition may be achieved.

According to an embodiment of the present invention, the aromatic vinyl-based monomer forming the aromatic vinyl-based monomer unit of the first graft copolymer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, the first graft copolymer may be prepared by bulk polymerization, and accordingly, may not include a residue such as an emulsifier, thereby achieving preventing effects of smell due to residues.

According to an embodiment of the present invention, the first graft copolymer may be included in 40 wt % to 80 wt %, 40 wt % to 75 wt %, or 40 wt % to 70 wt % based on the base resin, and within this range, the content of the second graft copolymer may be suitably maintained, and the occurrence of smell may be prevented. At the same time, effects of sufficiently securing mechanical properties and heat resistance may be achieved.

According to an embodiment of the present invention, the second graft copolymer may be a copolymer obtained by graft polymerizing a vinyl cyan-based monomer unit and an aromatic vinyl-based monomer unit in a rubbery polymer including a conjugated diene-based monomer unit. In a particular embodiment, the second graft copolymer may include 40 wt % to 80 wt % of the rubbery polymer, 1 wt % to 30 wt % of the vinyl cyan-based monomer unit, and 10 wt % to 50 wt % of the aromatic vinyl-based monomer unit, and may be emulsion polymerized.

According to an embodiment of the present invention, in the second graft copolymer, the rubbery polymer may be included in 40 wt % to 80 wt %, 50 wt % to 80 wt %, or 50 wt % to 70 wt % based on the second graft copolymer, and within this range, effects of excellent impact resistance of a resin composition may be achieved.

According to an embodiment of the present invention, in the rubbery polymer of the second graft copolymer, the conjugated diene-based monomer forming the conjugated diene-based monomer unit may be one or more selected from the group consisting of 1,3-butadiene, 2,3-dimethyl-1,3-butadiene, piperylene, 3-butyl-1,3-octadiene, isoprene and 2-phenyl-1,3-butadiene, more particularly, 1,3-butadiene.

According to an embodiment of the present invention, the rubbery polymer of the second graft copolymer may be a conjugated diene-based rubbery polymer including only a conjugated diene-based monomer unit, and in another embodiment, a conjugated diene-based-aromatic vinyl-based rubbery polymer including a conjugated diene-based monomer unit together with an aromatic vinyl-based monomer unit.

According to an embodiment of the present invention, in the rubbery polymer of the second graft copolymer, the aromatic vinyl-based monomer forming the aromatic vinyl-based monomer unit may be one or more selected from the group consisting of styrene, x-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, if the rubbery polymer of the second graft copolymer is a conjugated diene-based-aromatic vinyl-based rubbery polymer, each content of the conjugated diene-based monomer unit and the aromatic vinyl-based rubbery polymer unit in the rubbery polymer may be controlled, as necessary.

According to an embodiment of the present invention, in the second graft copolymer, the vinyl cyan-based monomer unit may be a component derived from a vinyl cyan-based monomer unit graft polymerized in the rubber polymer, and may be included in 1 wt % to 30 wt %, 1 wt % to 20 wt %, or 5 wt % to 15 wt % based on the second graft copolymer. Within this range, effects of improving the mechanical properties of the resin composition may be achieved.

According to an embodiment of the present invention, the vinyl cyan-based monomer forming the vinyl cyan-based monomer unit of the second graft copolymer may be one or more selected from the group consisting of acrylonitrile, methacrylonitrile, ethacrylonitrile, phenylacrylonitrile and α-chloroacrylonitrile, particularly, acrylonitrile.

According to an embodiment of the present invention, in the second graft copolymer, the aromatic vinyl-based monomer unit may be a component derived from an aromatic vinyl-based monomer unit graft polymerized in the rubbery polymer, and may be included in 10 wt % to 50 wt %, 20 wt % to 40 wt %, or 25 wt % to 35 wt % based on the second graft copolymer. Within this range, effects of improving the mechanical properties of the resin composition may be achieved.

According to an embodiment of the present invention, the aromatic vinyl-based monomer forming the aromatic vinyl-based monomer unit of the second graft copolymer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, the second graft copolymer may be prepared by emulsion polymerization, and due to the high content of the conjugated diene-based monomer unit, effects of improving impact resistance may be achieved.

According to an embodiment of the present invention, the second graft copolymer may be included in 1 wt % to 30 wt %, 1 wt % to 25 wt %, or 5 wt % to 20 wt % based on the base resin, and within this range, the occurrence of smell may be prevented, and at the same time, effects of improving tensile strength as well as impact resistance may be achieved.

As described above, the base resin according to the present invention may include the first graft copolymer and the second graft copolymer at the same time, and may use the first graft copolymer to prevent smell and include the second graft copolymer together in a suitable range to complement mechanical properties which may be degraded due to the first graft copolymer.

According to an embodiment of the present invention, the maleimide-based copolymer is for imparting the base resin with and for improving heat resistance, and may include a maleimide-based monomer unit that is a heat resistant monomer. Particular embodiment of the maleimide-based copolymer may include a maleimide-based monomer unit, an aromatic vinyl-based monomer unit and a maleic anhydride monomer unit, and particularly, the maleimide-based copolymer may be a ternary copolymer including a maleimide-based monomer unit, an aromatic vinyl-based monomer unit and a maleic anhydride monomer unit.

According to an embodiment of the present invention, the maleimide-based monomer forming the maleimide-based monomer unit of the maleimide-based copolymer may be a maleimide-based monomer in which hydrogen bonded to the N atom of maleimide is substituted with a substituent. In a more particular embodiment, the imide-based monomer may be one or more selected from the group consisting of N-methyl maleimide, N-ethyl maleimide, N-propyl maleimide, N-isopropyl maleimide, N-butyl maleimide, N-isobutyl maleimide, N-t-butyl maleimide, N-cyclohexyl maleimide, N-chlorophenyl maleimide, N-methylphenyl maleimide, N-bromophenyl maleimide, N-lauryl maleimide, N-hydroxyphenyl maleimide, N-methoxyphenyl maleimide, N-carboxyphenyl maleimide, N-nitrophenyl maleimide, N-phenyl maleimide, 2-methyl-N-phenyl maleimide, N-benzyl maleimide, N-naphthyl maleimide, and derivatives thereof, particularly, N-phenyl maleimide.

According to an embodiment of the present invention, the aromatic vinyl-based monomer forming the aromatic vinyl-based monomer unit of the maleimide-based copolymer may be one or more selected from the group consisting of styrene, x-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, the maleimide-based copolymer may be included in 5 wt % to 40 wt %, 10 wt % to 35 wt %, or 15 wt % to 35 wt % based on the base resin, and within this range, effects of markedly improving heat resistance while preventing the deterioration of impact resistance may be achieved.

According to an embodiment of the present invention, the base resin may further include a styrene-based copolymer including an aromatic vinyl-based monomer unit and a vinyl cyan-based monomer unit, and this may be a component forming the matrix of the base resin.

According to an embodiment of the present invention, in the styrene-based copolymer, the vinyl cyan-based monomer unit may be included in 10 wt % to 40 wt %, 15 wt % to 35 wt %, or 20 wt % to 30 wt % based on the styrene-based copolymer, and within this range, effects of improving the mechanical properties of the resin composition may be achieved.

According to an embodiment of the present invention, the vinyl cyan-based monomer forming the vinyl cyan-based monomer unit of the styrene-based copolymer may be one or more selected from the group consisting of acrylonitrile, methacrylonitrile, ethacrylonitrile, phenylacrylonitrile and α-chloroacrylonitrile, particularly, acrylonitrile.

According to an embodiment of the present invention, in the styrene-based copolymer, the aromatic vinyl-based monomer unit may be included in 60 wt % to 90 wt %, 65 wt % to 85 wt %, or 70 wt % to 80 wt % based on the styrene-based copolymer, and within this range, effects of improving the mechanical properties of the resin composition may be achieved.

According to an embodiment of the present invention, the aromatic vinyl-based monomer forming the aromatic vinyl-based monomer unit of the styrene-based copolymer may be one or more selected from the group consisting of styrene, x-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene, particularly, styrene.

According to an embodiment of the present invention, the styrene-based copolymer may be included in 0 wt % to 30 wt %, 1 wt % to 20 wt %, or 5 wt % to 15 wt % based on the base resin, and within this range, effects of preventing smell, while preventing the degradation of heat resistance may be achieved.

As described above, the base resin of the present invention may include 40 wt % to 80 wt % of the first graft copolymer, 1 wt % to 30 wt % of the second graft copolymer, 5 wt % to 40 wt % of the maleimide-based copolymer and 0 wt % to 30 wt % of the styrene-based copolymer, and within these ranges, the mechanical properties, heat resistance and friction noise resistance of the resin composition may be improved simultaneously.

According to an embodiment of the present invention, the polyolefin elastomer is for imparting the resin composition with friction noise resistance, and may be a homopolymer or a copolymer of an alpha olefin. In a particular embodiment, the polyolefin elastomer may be a copolymer of ethylene and an alpha olefin of 3 to 8 carbon atoms, more particularly, a copolymer of ethylene and 1-butene.

According to an embodiment of the present invention, the polyolefin elastomer may be included in 0.1 parts by weight to 10 parts by weight, 1 part by weight to 5 parts by weight, or 2 parts by weight to 3 parts by weight based on 100 parts by weight of the base resin, and within this range, effects of preventing the peeling of the resin composition, while improving friction noise resistance may be achieved.

According to an embodiment of the present invention, the polyolefin graft copolymer is for improving the compatibility with respect to the total components of the resin composition and may be a copolymer obtained by graft polymerizing another type of a comonomer component in the polyolefin. In a particular embodiment, the polyolefin graft copolymer may include one of a vinyl cyan-based monomer unit and an aromatic vinyl-based monomer unit graft polymerized to the polyolefin, more particularly, a polyethylene-based acrylonitrile-styrene copolymer obtained by graft polymerizing an acrylonitrile unit and a styrene unit to polyethylene. In this case, the polyethylene-based acrylonitrile-styrene copolymer may include 30 wt % to 70 wt % of polyethylene; and 30 wt % to 70 wt % of an acrylonitrile unit and a styrene unit.

According to an embodiment of the present invention, the polyolefin graft copolymer may be included in 0.1 parts by weight to 10.0 parts by weight, 1 part by weight to 5 parts by weight, or 1 part by weight to 3 parts by weight based on 100 parts by weight of the base resin, and within this range, compatibility with respect to the total components of the resin composition may be improved, and effects of preventing the peeling of the resin composition may be achieved.

According to an embodiment of the present invention, the polyolefin wax is for imparting the resin composition with friction noise resistance and at the same time, for complementing mechanical properties. In a particular embodiment, the polyolefin wax may be a homopolymer or copolymer of an alpha olefin in a wax type, more particularly, a polyethylene wax.

According to an embodiment of the present invention, the polyolefin wax may be included in 0.1 parts by weight to 10.0 parts by weight, 0.3 parts by weight to 5 parts by weight, or 1 part by weight to 3 parts by weight based on 100 parts by weight of the base resin. Within this range, effects of improving friction noise resistance and mechanical properties may be achieved simultaneously.

As described above, the resin composition of the present invention may include 0.1 parts by weight to 10.0 parts by weight of the polyolefin elastomer, 0.1 parts by weight to 10.0 parts by weight of the polyolefin graft copolymer and 0.1 parts by weight to 10.0 parts by weight of the polyolefin wax based on 100 parts by weight of the base resin, and within these ranges, mechanical properties, heat resistance and friction noise resistance of the resin composition may be improved simultaneously.

According to an embodiment of the present invention, the resin composition may have a Notched Izod impact strength measured at a thickness of ¼ inch at 23° C. according to ASTM D256 of 80 J/m or more, 100 J/m or more, 110 J/m or more, or 110 J/m to 200 J/m, and if this range is satisfied, it could be regarded to satisfy impact resistance required for a molded product.

According to an embodiment of the present invention, the resin composition may have a tensile strength measured under the conditions of a tensile rate of 50 mm/min according to ASTM D638 of 40 MPa or more, 44 MPa or more, 45 MPa or more, or 45 MPa to 60 MPa, and if this range is satisfied, it could be regarded to satisfy mechanical properties together with the impact resistance required for a molded product.

According to an embodiment of the present invention, the resin composition may have a heat deflection temperature measured under a load of 18.6 kgf according to ASTM D648 of 100° C. or higher, 100° C. to 120° C., or 100° C. to 110° C., and if this range is satisfied, it could be regarded to satisfy heat resistance required for a molded product.

According to an embodiment of the present invention, the resin composition may have the smell measured under conditions of a dry process at 80° C. for 2 hours according to VDA 270 of a third degree or less, and if this range is satisfied, it could be regarded to satisfy a smell degree required for a molded product.

According to an embodiment of the present invention, the resin composition may have an RPN ranking measured using a stick-slip tester at 25° C. and a relative humidity of 50% according to VDA 230-206 of 3 or less, and if this range is satisfied, it could be regarded to satisfy friction noise resistance required for a molded product.

The present invention provides a molded product molded from the resin composition.

According to an embodiment of the present invention, the molded product may be an extrusion and injection molded one from the resin composition and may be applied to a product group requiring mechanical properties, heat resistance and friction noise resistance at the same time, particularly, automotive interior materials.

Hereinafter, embodiments of the present invention will be explained in detail so that a person having ordinary knowledge in a technical field in which the present invention belongs to could easily perform. However, the present invention may be accomplished in various different types and is not limited to the embodiments explained herein.

EXAMPLES AND COMPARATIVE EXAMPLES

The components below in amounts indicated in Tables 1 to 3, were compounded together with a lubricant and a stabilizer to prepare resin compositions.

(1) First graft copolymer: manufactured by LG Chem, product name of ER400 (bulk polymerized ABS copolymer; 11 wt % of 1,3-butadiene unit, 18 wt % of acrylonitrile unit and 71 wt % of styrene unit)

(2) Second graft copolymer: manufactured by LG Chem, product name of DP270 (emulsion polymerized ABS copolymer; 60 wt % of 1,3-butadiene unit, 10 wt % of acrylonitrile unit and 30 wt % of styrene unit)

(3) Maleimide-based copolymer: manufactured by DENKA Co., product name of MS-NB (N-phenyl maleimide-styrene-maleic anhydride copolymer)

(4) Styrene-based copolymer: manufactured by LG Chem, product name of 80HF (24 wt % of acrylonitrile unit and 76 wt % of styrene unit)

(5) Polyolefin elastomer: manufactured by LG Chem, product name of LC875 (ethylene-1-butene copolymer)

(6) Polyolefin graft copolymer: manufactured by NOF Co., product name of MODIPER A1401 (polyethylene-graft-styrene-acrylonitrile)

(7) Polyolefin wax: manufactured by Lion Chemtech Co., product name of LC-104N (polyethylene wax)

EXPERIMENTAL EXAMPLES

Pellets of the resin compositions prepared in the Examples and Comparative Examples were formed by extruding at 240° C. using a biaxial extruder, and specimens were injected at 240° C. Impact strength, tensile strength, heat deflection temperature, smell and friction noise resistance were measured by the methods below and shown in Tables 1 to 3 below.

Impact strength (Notched Izod impact strength, J/m): Notched Izod impact strength on a specimen with a thickness of ¼ inch was measured at 25° C. according to ASTM D256.

Tensile strength (MPa): Tensile strength was measured under conditions of a tensile rate of 50 mm/min according to ASTM D638.

Heat deflection temperature (° C.): Heat deflection temperature was measured under conditions of a load of 18.6 kgf at 120° C./time according to ASTM D648.

Smell (degree): Smell was measured under conditions of a dry process at 80° C. for 2 hours according to VDA 270.

Friction noise resistance (risk priority number): Friction noise resistance was measured using a pair of specimens formed by the same conditions of 25° C. and a relative humidity of 50% using a stick-slip tester (SSP-04) of Ziegler Co., according to VDA 230-206, and shown as RPN.

TABLE 1

| Division | | Example | | |
|---|---|---|---|---|
| | | 1 | 2 | 3 |
| First graft copolymer | (parts by weight) | 60 | 60 | 45 |
| Second graft copolymer | (parts by weight) | 10 | 10 | 15 |
| Maleimide-based copolymer | (parts by weight) | 20 | 20 | 30 |
| Styrene-based copolymer | (parts by weight) | 10 | 10 | 10 |
| Polyolefin elastomer | (parts by weight) | 2.5 | 2.5 | 2.5 |
| Polyolefin graft copolymer | (parts by weight) | 2 | 2 | 2 |
| Polyolefin wax | (parts by weight) | 1 | 3 | 2 |
| Impact strength | (J/m) | 120 | 110 | 100 |
| Tensile strength | (MPa) | 46 | 45 | 45 |
| Heat deflection temperature | (° C.) | 102 | 101 | 107 |
| Smell | (degree) | 3 | 3 | 3 |
| Friction noise resistance (RPN) | | 3 | 3 | 3 |

TABLE 2

| Division | | Comparative Example | | | | | |
|---|---|---|---|---|---|---|---|
| | | 1 | 2 | 3 | 4 | 5 | 6 |
| First graft copolymer | (parts by weight) | 60 | 80 | — | 60 | 60 | 60 |
| Second graft copolymer | (parts by weight) | 10 | 10 | 30 | 10 | 10 | 10 |

TABLE 2-continued

| Division | | Comparative Example | | | | | |
|---|---|---|---|---|---|---|---|
| | | 1 | 2 | 3 | 4 | 5 | 6 |
| Maleimide-based copolymer | (parts by weight) | 20 | — | 20 | 20 | 20 | 20 |
| Styrene-based copolymer | (parts by weight) | 10 | 10 | 50 | 10 | 10 | 10 |
| Polyolefin elastomer | (parts by weight) | — | 2.5 | 2.5 | 2.5 | — | — |
| Polyolefin graft copolymer | (parts by weight) | — | 2 | 2 | — | 2 | — |
| Polyolefin wax | (parts by weight) | — | 1 | 1 | — | — | 3 |
| Impact strength | (J/m) | 120 | 220 | 210 | 95 | 110 | 120 |
| Tensile strength | (MPa) | 51 | 47 | 44 | 43 | 43 | 47 |
| Heat deflection temperature | (° C.) | 103 | 88 | 102 | 102 | 102 | 101 |
| Smell | (degree) | 3 | 3 | 4 | 3 | 3 | 3 |
| Friction noise resistance (RPN) | | 5 | 3 | 4 | 4 | 4 | 5 |

TABLE 3

| Division | | Comparative Example | | |
|---|---|---|---|---|
| | | 7 | 8 | 9 |
| First graft copolymer | (parts by weight) | 60 | 60 | 60 |
| Second graft copolymer | (parts by weight) | 10 | 10 | 10 |
| Maleimide-based copolymer | (parts by weight) | 20 | 20 | 20 |
| Styrene-based copolymer | (parts by weight) | 10 | 10 | 10 |
| Polyolefin elastomer | (parts by weight) | 2.5 | 2.5 | — |
| Polyolefin graft copolymer | (parts by weight) | 2 | — | 2 |
| Polyolefin wax | (parts by weight) | — | 1 | 1 |
| Impact strength | (J/m) | 125 | 90 | 105 |
| Tensile strength | (MPa) | 46 | 43 | 43 |
| Heat deflection temperature | (° C.) | 103 | 102 | 102 |
| Smell | (degree) | 3 | 3 | 3 |
| Friction noise resistance (RPN) | | 4 | 5 | 5 |

As shown in Table 1, it could be confirmed that the resin composition according to the present invention has excellent mechanical properties such as impact resistance and tensile strength, high heat deflection temperature and excellent heat resistance, no smell and reduced noise due to friction.

On the contrary, as shown in Table 2, it could be confirmed that Comparative Example 1 in which only a base resin was used and Comparative Examples 4 to 6, in which only one type of a polyolefin elastomer, polyolefin graft copolymer and polyolefin wax was added to a base resin, showed increased noise due to friction. Particularly, it could be confirmed that Comparative Example 4 in which only one type of a polyolefin elastomer was added to a base resin showed markedly deteriorated impact strength.

In addition, in case of Comparative Example 2 in which a maleimide-based copolymer was not included in a base resin, it could be confirmed that heat resistance was not complemented a maleimide-based copolymer, and heat deflection by temperature was rapidly reduced. In addition, in case of Comparative Example 3 in which a first graft copolymer was not included in a base resin, it could be confirmed that the ratio of an emulsion polymerized second graft copolymer was relatively increased in a base resin, and smell and noise due to friction were increased.

In addition, in case of Comparative Example 7 in which a polyolefin wax was not included, it could be confirmed that noise due to friction was increased, and in case of Comparative Example 8 in which a polyolefin graft copolymer was not included, it could be confirmed that noise due to friction was increased. Particularly, in case of Comparative Example 8, compatibility with respect to the total components of the resin composition was rapidly degraded, and as in Comparative Example 4, it could be confirmed that impact strength was markedly reduced. In addition, in case of Comparative Example 9 in which a polyolefin elastomer was not included, it could be confirmed that noise due to friction was increased.

From such results, it could be confirmed that the resin composition according to the present invention has excellent mechanical properties and heat resistance, and if molding a molded product for the use at a position where friction may occur such as automotive interior materials, friction noise resistance could be improved without using expensive silicone oil in the resin composition.

The invention claimed is:

1. A resin composition comprising:
   a base resin comprising:
      40 wt % to 80 wt % of a first graft copolymer that is a bulk polymerized copolymer,
      1 wt % to 30 wt % of a second graft copolymer that is a emulsion polymerized copolymer,
      5 wt % to 40 wt % of a maleimide-based copolymer, and
      1 wt % to 30 wt % of a styrene-based copolymer comprising an aromatic vinyl-based monomer unit and a vinyl cyanide-based monomer unit;
   0.1 parts by weight to 10 parts by weight, based on 100 parts by weight of the base resin, of a polyolefin elastomer including a copolymer of ethylene and an alpha olefin of 3 to 8 carbon atoms;
   0.1 parts by weight to 10 parts by weight, based on 100 parts by weight of the base resin, of a polyolefin graft copolymer including a polyethylene-based acrylonitrile-styrene copolymer; and
   0.1 parts by weight to 10 parts by weight, based on 100 parts by weight of the base resin, of a polyolefin wax that includes a polyethylene wax,
   wherein the first graft copolymer comprises;
      5 wt % to 30 wt % of a rubbery polymer, 5 wt % to 30 wt % of a vinyl cyan-based monomer unit, and 40 wt % to 90 wt % of an aromatic vinyl-based monomer unit, wherein the second graft copolymer comprises:

40 wt % to 80 wt % of a rubbery polymer, 1 wt % to 30 wt % of a vinyl cyanide-based monomer unit, and 10 wt % to 50 wt % of an aromatic vinyl-based monomer unit, and wherein the maleimide-based copolymer comprises:

a maleimide-based monomer unit, an aromatic vinyl-based monomer unit, and a maleic anhydride monomer unit.

2. The resin composition according to claim 1, wherein the resin composition has:

a heat deflection temperature of 100° C. or higher as measured at a load of 18.6 kgf according to ASTM D648; and an friction noise resistance (RPN) ranking of 3 or less as measured using a stick-slip tester at 25° C. and a relative humidity of 50% according to VDA 230-206.

3. A molded product molded from the resin composition according to claim 1.

4. The resin composition according to claim 1, wherein the base resin comprises 5 wt % to 15 wt % of a styrene-based copolymer.

\* \* \* \* \*